United States Patent [19]

Console et al.

[11] 3,965,079

[45] June 22, 1976

[54] SEPARATION AND RECOVERY OF PRODUCTS OBTAINED IN CATALYTIC PROCESSES OF PREPARING ACRYLONITRILE POLYMERS OR COPOLYMERS

[75] Inventors: Luciano Console, Mirano; Enzo Chiellini, Rosignano Solvay; Benedetto Calcagno, Milan, all of Italy

[73] Assignee: Societa' Italiana Resine S.I.R. S.p.A., Milan, Italy

[22] Filed: July 8, 1974

[21] Appl. No.: 486,735

[30] Foreign Application Priority Data

July 7, 1973  Italy .................................. 26269/73

[52] U.S. Cl. ............................... 526/68; 260/63 N; 526/69; 526/82; 526/341; 526/342; 526/328; 526/330; 526/347; 528/503

[51] Int. Cl.² ........................ C08F 4/40; C08F 6/00; C08F 20/44

[58] Field of Search ................... 260/85.5 S, 85.5 P, 260/88.7 B, 88.7 G; 450/629.5, 775, 85.5 R, 88.7 R

[56] References Cited
UNITED STATES PATENTS 3,060,159  10/1962  Lea et al. .......................... 260/85.5

3,454,542  7/1969  Cheape et al. ..................... 260/85.5

FOREIGN PATENTS OR APPLICATIONS 1,048,013  11/1966  United Kingdom .............. 450/629.5

*Primary Examiner*—Stanford M. Levin
*Attorney, Agent, or Firm*—Sughrue, Rothwell, Mion, Zinn & Macpeak

[57]  ABSTRACT

Sulphur dioxide and unreacted monomer or mixture of monomers are separated and recovered from the polymer or copolymer slurry obtained by polymerizing acrylonitrile monomer or copolymerizing acrylonitrile monomer and a further ethylenically unsaturated monomer copolymerizable therewith in the presence of a catalytic system comprising sulphur dioxide or a sulphite, by a process comprising the steps of separately removing the sulphur dioxide and the monomer or mixture of monomers from the slurry in two distinct volatilization zones connected in series under decreasing subatmospheric pressures, scrubbing with water the sulphur dioxide vapors removed in the first zone and vapors of unreacted monomer or monomers removed in the second zone, and recycling the two resulting aqueous solutions to the polymerization or copolymerization medium.

2 Claims, 1 Drawing Figure

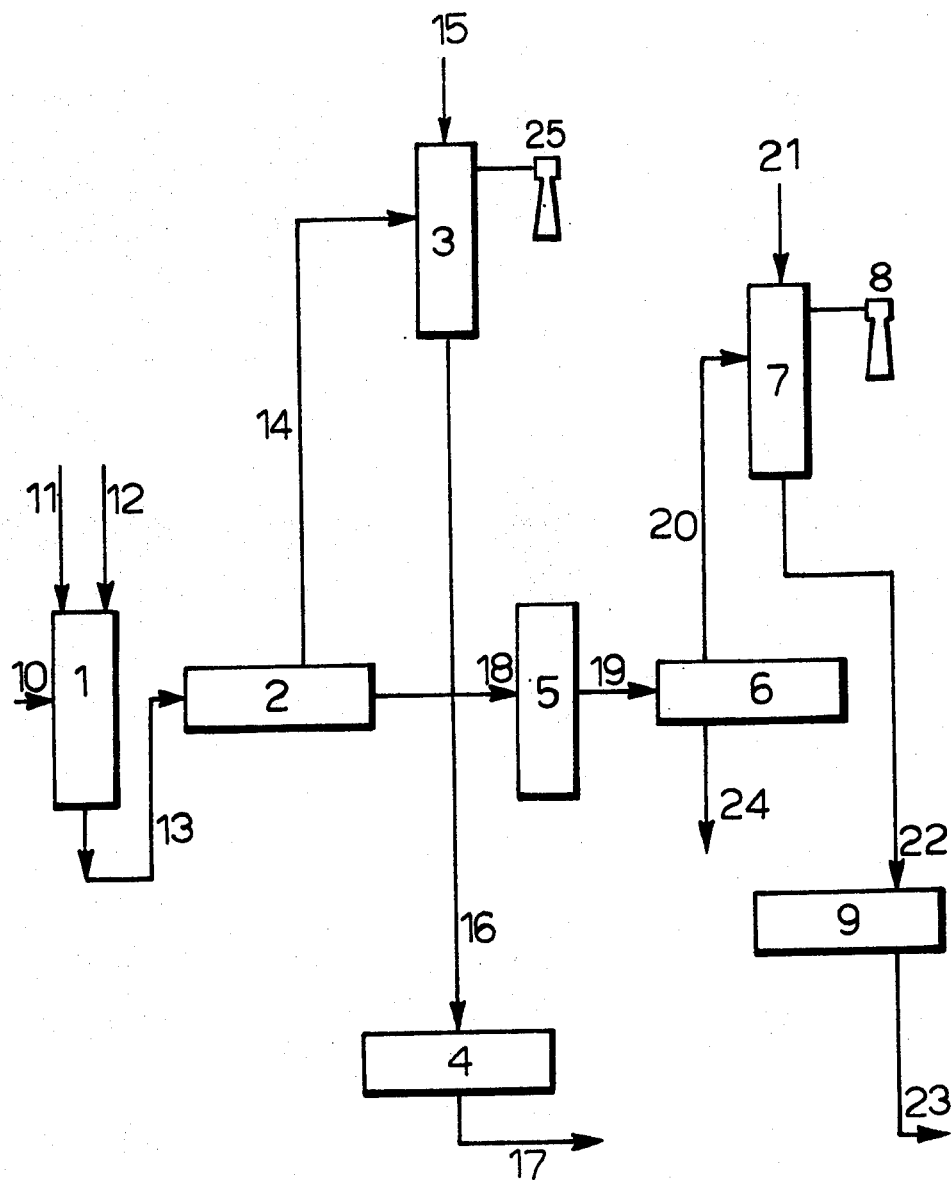

SEPARATION AND RECOVERY OF PRODUCTS OBTAINED IN CATALYTIC PROCESSES OF PREPARING ACRYLONITRILE POLYMERS OR COPOLYMERS

BACKGROUND OF THE INVENTION

1. Field of the Invention

The invention relates to the separation and recovery of sulphur dioxide and unreacted monomer or mixture of monomers from the products obtained in the catalytic polymerization of acrylonitrile and copolymerization of acrylonitrile with further ethylenically unsaturated monomers copolymerizable therewith.

2. Description of the Prior Art

It is known that polyacrylonitrile and copolymers of acrylonitrile containing the latter in a proportion of at least 85 percent by weight are widely used in the art, more particularly for the production of fibers. These polymers are prepared in the art by polymerization of acrylonitrile or by copolymerization of the latter with one or more ethylenically unsaturated compounds using suitable catalysts and normally operating in an aqueous medium. The best known catalysts for the purpose are the redox systems in which a percompound is used in combination with a reducing substance usually consisting of a sulphite or sulphur dioxide.

As is known, when polymerizing or copolymerizing acrylonitrile, complete or practically complete conversion of the monomers is not obtained. Moreover, the monomer conversion value is often maintained lower than those practically attainable, thereby to confer special properties to the acrylonitrile polymers. Therefore, the problem of separating and recovering the unreacted monomers from the reaction medium arises. Recovery of the monomers is as a matter of fact a factor considerably affecting the economy of a commercial process for preparing acrylonitrile polymers. Moreover, in such polymerization processes it is desirable to recover sulphur dioxide from the reaction medium, both in order to avoid its presence in wastes, and to re-utilize it in the polymerization process.

According to one widely exploited technique, the polymer slurry is filtered on completion of polymerization, the monomers being separated from the filtrate by distillation.

This procedure suffers from drawbacks due above all to monomer losses at the filtering step and to a possible polymerization at the recovery section of the apparatus, where a higher monomer concentration is present. Moreover, the process is expensive.

These drawbacks are avoided or at least substantially reduced by the present process of the invention which relates to the separation and recovery of the monomers and sulphur oxide from the polymer or copolymer slurry obtained by polymerization or copolymerization of acrylonitrile.

SUMMARY OF THE INVENTION

Thus, the present invention provides a process for separating and recovering sulphur dioxide and unreacted monomer or mixture of monomers from the polymer or copolymer slurry obtained by polymerizing acrylonitrile monomer or copolymerizing a mixture of acrylonitrile monomer with further ethylenically unsaturated monomers copolymerizable therewith in an aqueous medium in the presence of a catalytic redox system comprising a peroxide, a persulphate or a chlorate in combination with sulphur dioxide or a sulphite, characterized by the steps of:

removing from the polymer or copolymer slurry by volatilization in a first vaporization step sulphur dioxide, and in a second vaporization step unreacted monomer or mixture of monomers, in two distinct volatilization zones connected in series with each other, under decreasing subatmospheric pressure values;

absorbing with water the sulphur dioxide vapors removed in the first zone and the vapors of unreacted monomer or mixture of monomers removed in the second zone;

recycling the two resulting aqueous solutions to the polymerization medium.

The preferred sulphites are water-soluble sulphites, such as alkali metal sulphites, the preferred peroxides are hydrogen peroxide and benzoyl peroxide, the preferred chlorates are alkali metal chlorates and the preferred persulphates are alkali metal or ammonium persulphates. The preferred alkali metal is sodium.

The polymerization or copolymerization is conveniently carried out with a molar ratio of the peroxide, persulphate or chlorate to the sulphur dioxide or sulphite from 1:1 to 1:70 and with a proportion of the peroxide, persulphate or chlorate from 0.1 to 2 parts by weight to 100 parts monomer or mixture of monomers.

Moreover, the polymerization or copolymerization is conveniently carried out at a temperature of the order of 50°C during a period such as to ensure a conversion from 60 to 90 percent of the monomer or mixture of monomers.

DETAILED DESCRIPTION OF THE INVENTION

According to the process of the present invention, the slurry obtained on completion of polymerization or copolymerization, having a preferred polymer or copolymer content of the order of 10–20 percent by weight, is treated for recovering sulphur dioxide and unreacted monomer or mixture of monomers. Advantageously, the slurry discharged from the polymerization reactor is admixed with a mineral acid, preferably sulphuric acid, in order to adjust the pH to a value from 1.8 to 2.5, preferably around 2. Conveniently, a polymerization inhibitor such as hydroquinone or hydroquinone monomethyl ether is added. The resulting acidic slurry is fed to an evaporator maintained at a subatmospheric pressure, preferably from 60 to 150 mm mercury column, in which the temperature of the slurry is preferably from 40° to 60°C. Sulphur dioxide is evolved as a vapor, which is substantially free from monomer or mixture of monomers and is scrubbed with water preferably cooled to 1°–15°C. The resulting aqueous solution can be directly recycled to the polymerization medium, after replenishing with sulphur dioxide and possible conversion of sulphur dioxide to a sulphite, such as alkali metal sulphite.

The removal of sulphur dioxide can be carried out in a plurality of evaporators connected in series, operated at decreasing pressure values, still within the above-indicated range. In actual practice not more than 3 evaporators will be employed. By proceeding as above the sulphur dioxide recovery exceeds 60 percent of the sulphur dioxide discharged from the polymerization reactor.

The slurry deprived of sulphur dioxide is fed to an evaporator in which is maintained a lower subatmospheric pressure, preferably 1 to 60 mm mercury column and in which the temperature of the slurry is preferably of the order of 30°–55°C. The unreacted monomer or mixture of monomers are evolved in a substantially pure state as vapors and scrubbed with water preferably cooled to 1°–30°C. The thus recovered monomer or mixture of monomers can be directly recycled to the polymerization medium without any purification treatment. Removal of the unreacted monomer or mixture of monomers can be carried out in a plurality of evaporators connected in series, operated at decreasing pressure values, still within the above-indicated range. In actual practice not more than three evaporators will be employed. By operating as above-described the monomer or mixture of monomers recovery exceeds 96 percent of the monomer or mixture of monomers present in the slurry discharged from the polymerization reactor.

The present process allows the recovery of the acrylonitrile monomer as well as of any further ethylenically unsaturated monomer copolymerizable therewith, such as for instance methyl acrylate, vinyl acetate, styrene, methyl vinyl ketone.

The slurry deprived of sulphur dioxide and unreacted monomer or mixture of monomers is finally submitted to filtering or centrifuging for separating the polymer or copolymer. The latter is washed and dried by conventional techniques.

By operating according to the process of the present invention, first of all a high recovery of sulphur dioxide and unreacted monomer or mixture of monomers is obtained. Moreover, by operating as described, undesirable polymerization or copolymerization processes are avoided because sulphur dioxide and monomer or mixture of monomers are separately vaporized. Moreover, the described treatments do not effect the polymer or copolymer color or other properties thereof. Finally, the process of the invention is as a whole simple and economically convenient.

Referring to the drawing, the polymer or copolymer slurry coming from the polymerization reactor is fed through a pipe 10 to a container 1. The polymerization inhibitor and mineral acid for adjusting the pH to the desired value are fed through pipes 11, 12, respectively. The slurry delivered by pipe 13 is fed to an evaporator 2 in which sulphur dioxide volatilizes. The evaporator 2 can be a stirred vessel. The evolved sulphur dioxide is conveyed by a pipe 14 to an absorber 3 at the top of which water is supplied by pipe 15. The absorber 3 may be a column fitted with trays or a filling, or any apparatus ensuring a through mutual contact between gases and liquids.

An ejector 25 sets up the desired reduced pressure in the evaporator 2. Obviously, it may be replaced by any other suitable means adapted to set up a required subatmospheric pressure. An aqueous sulphur dioxide solution is recovered from the bottom of the absorber 3 through pipe 16 and conveyed to a reservoir 4, from which the solution is recycled to the polymerization medium through a pipe 17. The slurry deprived of sulphur dioxide is conveyed to a reservoir 5 through a pipe 18, then to an evaporator 6 through a pipe 19. In the evaporator 6, which is similar to the evaporator 2, the monomer or mixture of monomers are vaporized, then conveyed to an absorber 7 through a pipe 20.

Water is fed at the absorber top through a pipe 21, the monomer solution being drawn through a pipe 22 and conveyed to the reservoir 9. Recycle to the polymerization medium is effected through a pipe 23. An ejector 8 maintains in the evaporator 6 the desired reduced pressure. Finally, the slurry discharged through a pipe 24 is submitted to conventional treatments for separation, washing and drying of the polymer or copolymer.

EXAMPLE 1

Five copolymerization vessels are installed, which are lined with glass and each equipped with a stirrer and a heat exchange jacket. Four (primary) vessels of a capacity each of 100 liters are connected in parallel with one another, each of them being connected in series with the fifth (secondary) vessel of 200 liters capacity.

Moreover, the four primary copolymerization vessels are located at a higher level than the fifth secondary vessel, in order to cause the transfer of the polymerization mass from the primary vessels to the secondary one by overflow. The primary and secondary copolymerization vessels are filled with water admixed with sulphuric acid in order to adjust the pH at 3, the temperature in each vessel being 50°C. Each primary copolymerization vessel is supplied with the following streams at the stated rates:

340 ml/min of a mixture consisting of 92 percent by weight acrylonitrile and 8 percent by weight methyl acrylate, 660 ml/min of an aqueous solution containing 0.73 parts by weight sodium chlorate to 1,000 parts by weight water, 660 ml/min of an aqueous solution obtained by adding 8.3 parts by weight sodium hydroxide and 13.2 parts by weight sulphur dioxide to 1,000 parts by weight water.

The residence time in each of the primary vessels is 60 minutes, in the second vessel 30 minutes; the overall copolymerization time is therefore 90 minutes.

The copolymerization is carried out at 50°C while the mass is stirred in each vessel. After 360 minutes the system is in its normal working conditions. A slurry is continuously discharged, comprising water (1,350 ml/min), monomers (95 ml/min) and copolymer (245 g/min).

More particularly, the copolymer has a specific viscosity of 0.137 measured at 25°C.

Referring to the drawing, the slurry is fed at the stated rate through the pipe 10 to the container 1 in which it is inhibited by admixing it with 10 ppm hydroquinone monomethyl ether (fed through pipe 11) and is brought to pH 2 by means of sulphuric acid (fed through pipe 12). The slurry is then continuously fed through pipe 13 to the evaporator 2 which is a vessel fitted with a stirrer. In the evaporator 2 sulphur dioxide is volatilized while a pressure of 100 mm mercury column and a slurry temperature of 45°C are maintained. More particularly, the said pressure is maintained by means of the ejector 25 connected with the evaporator 2 through the absorber 3. The said absorber is an absorbing tower provided with filling bodies, at the top of which water at 2°C is fed through the pipe 15 at a rate of 330 ml/min to a sprinkler mounted in the top section of the tower. The sulphur dioxide coming from the pipe 14 is thereby absorbed, the resulting solution being discharged through the pipe 16 and conveyed to the reservoir 4. The copolymer slurry still containing 15 percent by weight monomers and small quantities only of sulphur dioxide is continuously conveyed to the reservoir 5 through the pipe 18, then to the evaporator 6 through pipe 19. A pressure of 40 mm mercury column is maintained in the said evaporator 6 by means of the ejector 8 connected with the evaporator 6 through the absorber 7.

In the evaporator 6, the monomers are practically thoroughly removed by operating at the said pressure and at a slurry temperature of about 32°C. The gaseous monomers are conveyed to the absorption tower 7 through the pipe 20.

Water at a temperature of 10°C is fed at a rate of 330 ml/min to a sprinkler in the tower top through the pipe 21. The liquid is then recovered at the bottom of the tower 7 through the pipe 22 and conveyed to the collecting reservoir 9.

The analysis of the product in the said reservoir 9 shows that 7.15 parts by weight monomers and 1.03 parts by weight sulphur dioxide are present for each 100 parts by weight water.

The contents of the reservoirs 4 and 9 are recycled to the primary copolymerization reactors as part of the respective feeds.

Under normal working conditions a recovery of the monomers amounting to 97 percent and recovery sulphur oxide amounting to 70 percent is obtained.

What we claim is:

1. A method of separating and recovering both sulphur dioxide and unreacted monomer from the polymer or copolymer slurry obtained from polymerizing acrylonitrile monomer or from copolymerizing a mixture of acrylonitrile monomer and a further ethylenically unsaturated monomer copolymerizable therewith, the polymerizing or copolymerizing occurring in an aqueous medium and in the presence of a catalytic redox system which includes sulphur dioxide or a sulfite in combination with a compound selected from the group consisting of peroxides, persulfates and chlorates; said method comprising the steps of
   1. admixing with said slurry a polymerization inhibitor and a mineral acid for adjusting the pH of said slurry to 1.8 to 2.5;
   2. removing sulphur dioxide from said slurry by volatilization in a first vaporization stage conducted at a pressure of from 60 to 150 mm mercury and at a slurry temperature of from 40° to 60°C;
   3. scrubbing the sulphur dioxide vapors obtained from (2) with water having a temperature of from 1° to 15°C, and recycling the aqueous solution obtained to the polymerization or copolymerization medium;
   4. thereafter, removing unreacted monomer from said slurry by volatization in a second vaporization stage conducted at a pressure of from 1 to 60 mm mercury and at a slurry temperature of from 30° to 55°C; and
   5. scrubbing vapors obtained from (4) with water having a temperature of from 1° to 30°C, and recycling the aqueous solution obtained to the polymerization or copolymerization medium.

2. The method of claim 1, wherein each of the vaporization steps (2) and (4) is carried out in a plurality of evaporators interconnected in series.

* * * * *

UNITED STATES PATENT AND TRADEMARK OFFICE
CERTIFICATE OF CORRECTION

PATENT NO. : 3,965,079
DATED : June 22, 1976
INVENTOR(S) : Luciano Console et al It is certified that error appears in the above-identified patent and that said Letters Patent are hereby corrected as shown below:

Under "Foreign Application Priority Data", delete "July 7, 1973 and insert therefor -- July 6, 1973 --.

Signed and Sealed this

Nineteenth Day of October 1976

[SEAL]

Attest:

RUTH C. MASON
*Attesting Officer*

C. MARSHALL DANN
*Commissioner of Patents and Trademarks*